Patented Apr. 6, 1937

2,075,889

UNITED STATES PATENT OFFICE 2,075,889

MANUFACTURE OF ALIPHATIC ANHYDRIDES

Henry Dreyfus, London, England

No Drawing. Application August 22, 1933, Serial No. 686,316. In Great Britain August 26, 1932

8 Claims. (Cl. 260—123)

This invention relates to the manufacture of aliphatic anhydrides, and especially acetic anhydride, by the thermal decomposition of the corresponding acids.

I have found that the thermal decomposition of the acids into the anhydrides and water may be effected by passing the acid through a fluid composition comprising one or more of the following substances in the molten form: a salt of a halogen acid, a metal oxide or a salt of a weak oxyacid, such as a molybdate, arsenate, borate or vanadate, which substances alone or in admixture with other such substances are molten at the required temperature. Moreover, I have found that at temperatures insufficiently high to give rise to thermal decomposition, such fluid compositions may be employed for preheating the acids before effecting their decomposition; organic compounds which are stable and remain liquid under the prevailing conditions may also be employed for preheating the acid.

As examples of particular inorganic compounds which may be employed in the preheating bath the following salts may be mentioned:—cadmium chloride, cuprous chloride, lead chloride, thallium monochloride. Usually, however, it is preferable to employ mixtures of two or more salts or compounds, as such mixtures frequently melt at a lower temperature than does either of the constituents by itself. As preheating baths the following mixtures may be specially mentioned, although they may of course, also be employed for the actual decomposition:—potassium chloride and cuprous chloride, silver chloride and cuprous chloride, cuprous chloride and sodium chloride, sodium chloride and lithium chloride.

The majority of salt mixtures, however, melt at temperatures somewhat too high to enable their use in the preheating bath, but many of them may very usefully be employed in the decomposition bath. Examples of mixtures that may be so used are, in addition to those mentioned above as suitable also for the preheating bath:— lead chloride and potassium chloride, sodium chloride and potassium chloride, sodium chloride and strontium chloride, sodium chloride and thallium chloride, sodium arsenate and potassium arsenate, sodium borate and lithium borate, molybdic oxide and sodium molybdate, sodium molybdate and sodium pyromolybdate, lead oxide and lead chloride, lead oxide and lead metasilicate. Certain mixed silicates and mixtures of silicates and other naturally occurring salts of weak acids or halogen acids may also be employed.

As examples of high boiling organic compounds which may be employed in the preheating bath may be mentioned hydrocarbons of high molecular weight such as those obtained from petroleum and the like and high molecular aromatic hydrocarbons such as diphenyl p,p-dixylenyl, diphenyl diphenylenemethane, $\alpha,\alpha,\beta,\beta$-tetraphenylpropane, 2-methyl-9,10-diphenyl anthracene.

When preheating baths containing such organic liquids are employed, I preferably pass the acid vapors after passage through the bath up a column the top of which is maintained at a suitable temperature below the boiling point of the heating medium in order to prevent escape of substantial quantities of such vapors from the preheating bath to the decomposition zone without appreciably cooling the acid vapors.

The particular substance or substances to be employed will, of course, depend largely on the temperatures which it is desired to attain. Thus, if the acid vapors are to be preheated to a very moderate degree only, say to about 200° C., a mixture of salts which melts below this temperature, for instance a mixture of potassium chloride and cuprous chloride, may advantageously be employed. Certain organic substances, for instance diphenyl, triphenyl-benzyl methane or $\alpha,\alpha,\beta,\beta$-tetraphenyl propane may also be employed. Usually, however, it is preferable to preheat to a higher temperature, say 350° to 400° C. or even higher, and a larger range of heating media is then available, for instance mixtures of potassium chloride and lithium chloride or even potassium chloride and sodium chloride; organic compounds may also be employed, although for temperatures substantially exceeding 350° C. I prefer to use inorganic compounds. Examples of organic compounds that may, however, be used at such temperatures are tetraphenyl ethane, $\alpha,\alpha,\beta,\beta$-tetraphenyl propane and 9,10-diphenylanthracene.

The thermal decomposition is preferably performed at temperatures between about 400° and 900° C., and especially between about 600° and 800° C. The molten baths may comprise, for example, any of the salt mixtures given above, although if higher temperatures, for instance temperatures above 700° C., are to be employed, it is preferable to employ salts or mixtures of salts having a comparatively high melting point, for example sodium chloride and strontium chloride, sodium fluoride and lead fluoride, potassium chloride and potassium fluoride, sodium molybdate and sodium pyromolybdate, sodium borate and lithium borate, etc.

The decomposition bath may contain in addition substances having a favorable catalytic effect on the reaction, and such substances may also serve to lower the melting point of the mixture. For example, the following mixtures, comprising a molten salt as heating medium and a catalyst, may be employed:—potassium borate and potassium metaphosphate, potassium chloride and potassium metaphosphate, or certain naturally occurring mixtures comprising phosphates such as pyromorphite may be used.

The molten baths of the present application may, of course, also comprise elementary substances such as lead or tellurium, or alloys, as specifically described and claimed in U. S. application S. No. 620,547 filed 1st July, 1932, and as further described and claimed therein, relatively infusible metals such as copper, nickel or silver, or oxides of metals, may also be added to the molten baths. Further, if desired, the molten baths may be employed in conjunction with gaseous or vaporous catalysts.

The anhydride produced by the process may be recovered from the reaction gases or vapors in any convenient way, but in order to avoid loss of anhydride through hydrolysis the reaction vapors are preferably not subjected to simple condensation but to treatment to separate the anhydride from the water vapor present or produced in the reaction. For instance, the reaction vapors may advantageously be submitted to the treatments described in U. S. Patents Nos. 1,735,957, 1,817,614, 1,915,573 and 1,931,687. Again, the water may be removed wholly or partly by chemical means as described and claimed in my U. S. application S. No. 620,544 filed 1st July, 1932 in which case the reaction with the water may be effected either by treatment of the reaction vapors with hydrocarbons, carbon monoxide or other substances or by passing said hydrocarbons, carbon monoxide or other gaseous substances in admixture with the aliphatic acid vapor through the baths employed for performing the thermal decomposition; in this latter case there is preferably incorporated in said baths one or more catalysts capable of promoting the reaction with water and particularly one or more of the catalysts instanced in my said previous specification.

It is to be understood that the invention is not limited in respect to the concentration of the aliphatic acid employed for the purposes of the invention, as dilute as well as concentrated or highly concentrated acids may be employed, and the process provides inter alia valuable means for manufacturing acetic anhydride from waste dilute acids such as result from the acetylation of cellulose or other industrial acetylation processes.

The following examples illustrate the invention, which is in no way limited thereby.

*Example 1*

Acetic acid of concentration about 95% is vaporized and led through a bath consisting of 65% sodium chloride and 35% lithium chloride which is heated to a temperature of about 350° C. On leaving this bath the vapors are led into a bath consisting of sodium chloride and potassium chloride in equal proportions heated to 750° C. After leaving the reaction zone the products may be treated in any convenient way to condense the anhydride formed while the water still remains in the vapor phase.

*Example 2*

Acetic acid is treated as in Example 1 except that the second bath contains about 10% of potassium metaphosphate or of aluminium metaphosphate, the temperature of the bath being maintained between 700° and 750° C.

*Example 3*

Propionic acid vapor is passed through a bath containing a petroleum fraction of boiling point about 350° C. and higher. The bath is heated to a temperature in the region of 300° C., and the vapors leaving the bath are passed up a condensing column maintained at about 280° C. The acid vapors leaving the condenser are subjected to the thermal decomposition by being led into one of the baths specified in Examples 1 and 2, at a temperature of about 700° C.

The term "metal" as employed hereinafter in the claims does not include pseudo metals or metalloids such as arsenic or antimony.

What I claim and desire to secure by Letters Patent is:—

1. Process for the manufacture of a lower aliphatic anhydride by the thermal decomposition of the corresponding acid, which comprises passing the acid through a molten composition comprising, as an essential constituent, a substance having at most moderate affinity for water and selected from the group consisting of metal borates, metal vanadates and metal molybdates.

2. Process for the manufacture of acetic anhydride by the thermal decomposition of acetic acid, which comprises passing the acid through a molten composition comprising, as an essential constituent, a substance having at most moderate affinity for water and selected from the group consisting of metal borates, metal vanadates and metal molybdates.

3. Process for the manufacture of propionic anhydride by the thermal decomposition of propionic acid, which comprises passing the acid through a molten composition comprising, as an essential constituent, a substance having at most moderate affinity for water, and selected from the group consisting of metal borates, metal vanadates and metal molybdates.

4. Process for the manufacture of acetic anhydride by the thermal decomposition of acetic acid, which comprises passing the acid through a molten composition, at a temperature between 400 and 900° C., comprising, as an essential constituent, a substance having at most moderate affinity for water and selected from the group consisting of metal borates, metal vanadates and metal molybdates.

5. Process for the manufacture of acetic anhydride by the thermal decomposition of acetic acid, which comprises preheating the acid to a temperature between 200 and 400° C. and then passing it through a molten composition, at a temperature between 600 and 800° C., comprising, as an essential constituent, a substance having at most moderate affinity for water and selected from the group consisting of metal borates, metal vanadates and metal molybdates.

6. Process for the manufacture of acetic anhydride by the thermal decomposition of acetic acid, which comprises passing the acid through a molten composition, at a temperature between 400 and 900° C., comprising, as an essential constituent, a substance having at most moderate affinity for water and selected from the group consisting of metal borates, metal vanadates and metal molybdates, and containing a phosphate.

7. Process for the manufacture of acetic acid, which comprises passing the acid through a molten composition, at a temperature between 400 and 900° C., comprising as an essential constituent, a metal vanadate having at most moderate affinity for water, and containing a metaphosphate.

8. Process for the manufacture of a lower aliphatic anhydride by the thermal decomposition of the corresponding acid, which comprises passing the acid through a molten composition comprising, as an essential constituent, a metal vanadate.

HENRY DREYFUS.